E. C. BALLMAN.
SPARK COIL TESTING APPARATUS.
APPLICATION FILED JULY 19, 1918.
1,339,804.
Patented May 11, 1920.
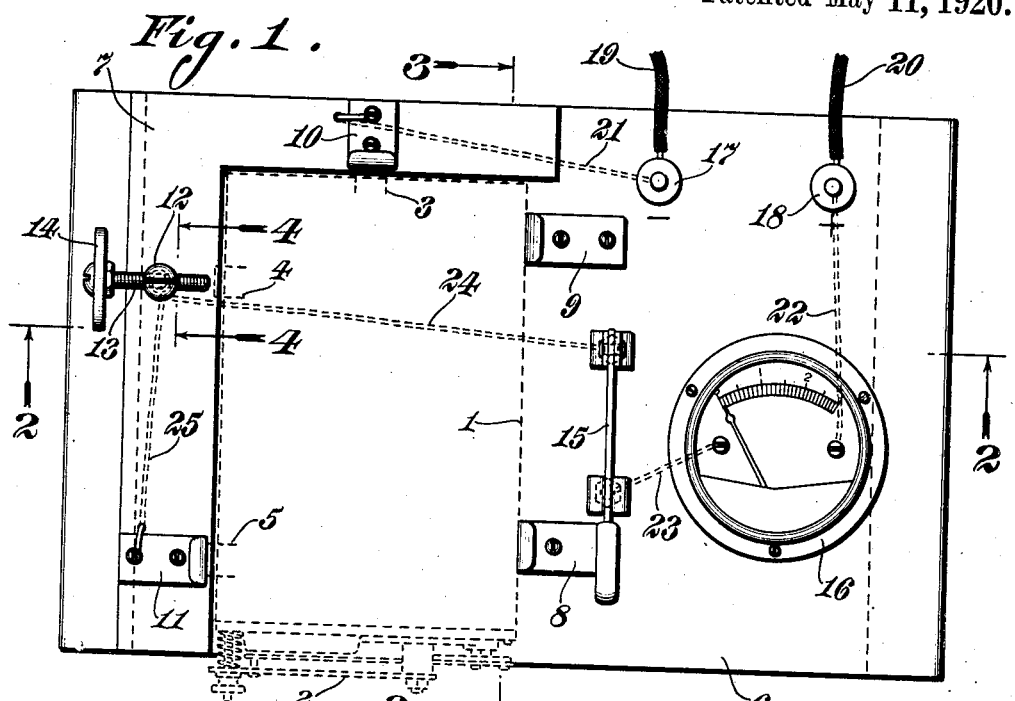
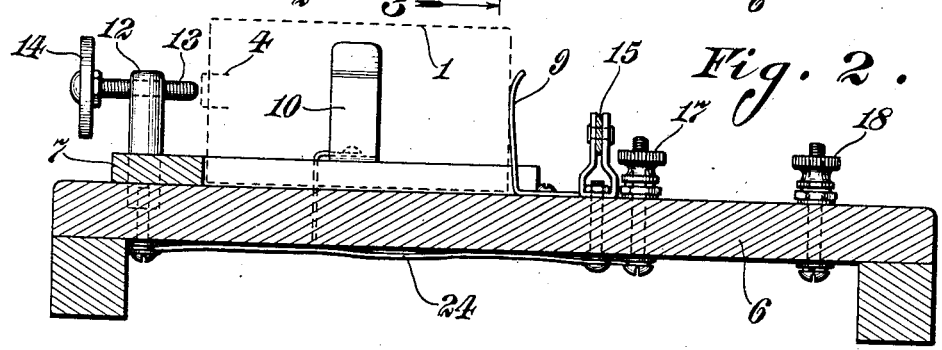
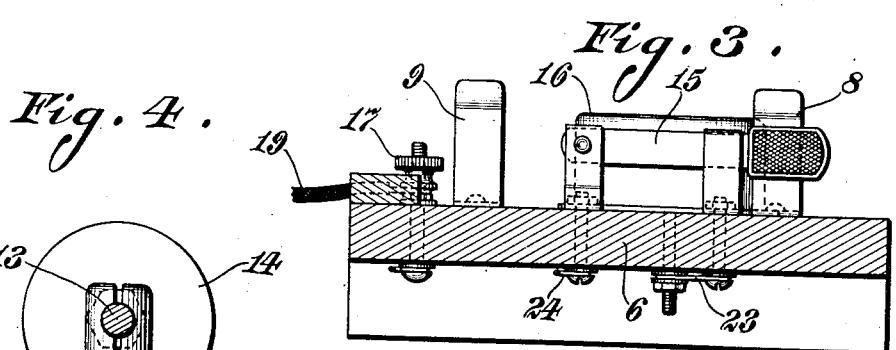
Inventor:
EDWIN C. BALLMAN,
By John N. Bruninga,
His Attorney.

UNITED STATES PATENT OFFICE.

EDWIN C. BALLMAN, OF ST. LOUIS, MISSOURI, ASSIGNOR TO STAHL A. WHITTEN, OF ST. LOUIS, MISSOURI.

SPARK-COIL-TESTING APPARATUS.

1,339,804. Specification of Letters Patent. Patented May 11, 1920.

Application filed July 19, 1918. Serial No. 245,736.

*To all whom it may concern:*

Be it known that I, EDWIN C. BALLMAN, a citizen of the United States, and residing at St. Louis, Missouri, have invented a new and useful Improvement in Spark-Coil-Testing Apparatus, of which the following is a specification.

This invention relates to an apparatus for testing coils, and more particularly for testing the spark coils used in automobiles.

A spark coil is usually in the form of a box, in which the windings are arranged, and the terminals of the windings project through the box in the form of plugs, so as to make connections with suitable terminal connectors on the automobile body. Such a coil is provided with a vibrator, and this vibrator must be adjusted to the required position, so that the spark coil will produce a spark of maximum volume and temperature.

One of the objects of this invention, therefore, is to provide a spark coil testing apparatus by means of which the coil can be readily tested and adjusted, so as to produce a spark of maximum volume and temperature, and which apparatus is so constructed and arranged as to be convenient for operation.

Further objects will appear from the detail description taken in connection with the accompanying drawing, in which, Figure 1 is a plan of a spark coil testing apparatus embodying this invention, the spark coil being shown in dotted position;

Fig. 2 is a section on the line 2—2, Fig. 1;

Fig. 3 is a section on the line 3—3, Fig. 4; and,

Fig. 4 is an enlarged section on the line 4—4, Fig. 1.

Referring to the accompanying drawing, 1 designates the coil to be tested. This coil is provided with a vibrator 2, and with a series of terminal plugs 3, 4 and 5, projecting through the spark coil box. This spark coil is of well known construction, and further description will, therefore, be unnecessary.

The apparatus embodying this invention comprises a base 6 of wood or any other suitable insulating material, upon which is mounted an L-shaped ledge 7. Mounted on the base are a pair of spring clips 8 and 9, and mounted on the ledge 7 are a pair of spring clips 10 and 11. The L-shaped ledge 7 is arranged to position the end and side of the coil box, and the coil box is pressed against this ledge by the spring clips 8 and 9, which are rounded at their upper ends to permit ready insertion of the coil box. The clips 10 and 11 are placed on the ledge, so that when the coil box is placed in the ledge and held thereagainst, these clips will come opposite the terminals 3 and 5, projecting through the coil box. It will, of course, be understood that the spring clips hold the coil box firmly in position, and with the clips 10 and 11 in firm engagement with the terminal plugs 3 and 5, so as to make good electric connections therewith.

Mounted on the ledge 7 is a post 12, which is threaded at its upper end to receive a threaded screw 13, which has a head 14 of fiber or other suitable insulating material, and the end of this screw is conical so as to form an electrode. The post is, furthermore, split, as shown in Fig. 4, so that it can be contracted before insertion of the electrode screw to frictionally hold the screw in adjusted position. The post 12 is placed so that the electrode will come opposite the terminal plug 4 in the coil box, so that this electrode will form with the terminal plug 4, a spark gap, the length of spark gap being adjustable by adjustment of the electrode screw in its post.

Mounted on the base 6 is a knife switch 15, and an ammeter 16, as well as binding posts 17 and 18, adapted for connection with conductors 19 and 20, so that these binding posts may be connected to a suitable battery. The connections between the binding posts, the knife switch, the clips 10 and 11, and the electrode posts 12, are shown in Fig. 1. A connection 21 leads from the binding post 17 to the clip 10, while the other binding post has connections 22, 23, and 24, leading through the ammeter and the switch to the electrode post 12, while another connection 25 leads from the electrode post to the clip 11. It will, of course, be understood that the terminal plug 3 is the low tension terminal, plug 4 the high tension terminal, and the plug 5, the common low tension-high tension terminal.

In order to test a coil, it is placed in position between the clips and against the ledge 7. A battery connected across the binding posts 17 and 18 will furnish the low tension current, and this current in passing through the primary of the coil, will cause vibration of the vibrator, and set up a high tension current in the secondary coil between the terminal plugs 4 and 5. The connection between the terminal plugs 4 and 5 is, however, interrupted by a gap between the electrode 13 and the terminal plug 4. This gap can now be adjusted by adjustment of the electrode screw, and the vibrator can also be adjusted so as to give the maximum volume and temperature of spark, while the current passing through the primary is indicated by the meter. In this way the coil can be adjusted for the most efficient operation, and after the completion of the test, the switch can be opened and the coil removed.

It is obvious that various changes may be made in the details without departing from the spirit of this invention. It is, therefore, to be noted that this invention is not to be limited to the specific construction shown and described.

Having thus described the invention, what is claimed is:

1. A spark coil testing apparatus, comprising, a base, a series of elements mounted on said base and adapted to receive and support a coil and connect with the terminals thereof, and an electrode mounted on said base and adapted to coöperate with one of the terminals of the coil to form a spark gap.

2. A spark coil testing apparatus, as claimed in claim 1, characterized by the feature that the electrode is adjustable to vary the spark gap.

3. A spark coil testing apparatus, comprising, a base, a series of clips mounted on said base and adapted to receive and support a coil, certain of said clips being adapted for connection with certain of the terminals of the coil, and an electrode mounted on said base and adapted to coöperate with another terminal of the coil to form a spark gap.

4. A spark coil testing apparatus, comprising, a base, a series of clips mounted on said base and adapted to receive and support a coil, certain of said clips being adapted for connection with certain of the terminals of the coil, an electrode mounted on said base and adapted to coöperate with another terminal of the coil to form a spark gap, and a switch mounted on said base and connected with one of said clips.

In testimony whereof I affix my signature this 10th day of Sept., 1917.

EDWIN C. BALLMAN.